No. 852,999. PATENTED MAY 7, 1907.
J. B. BROOKS.
WATER BOTTLE, WATER CUSHION, WATER BED, AND LIKE RECEPTACLE.
APPLICATION FILED NOV. 24, 1906.
3 SHEETS—SHEET 1.
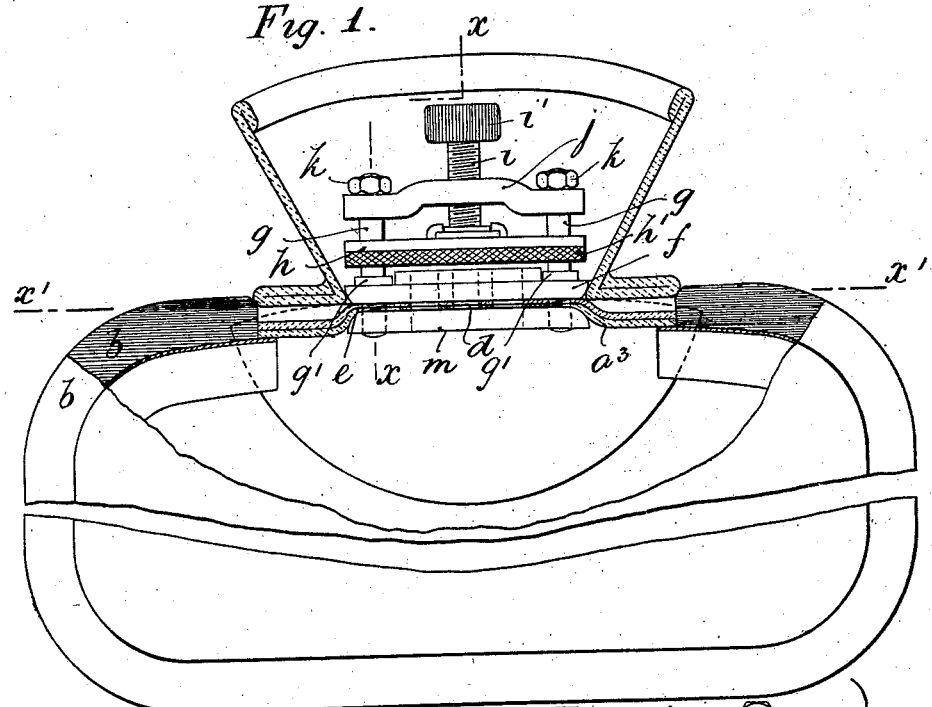
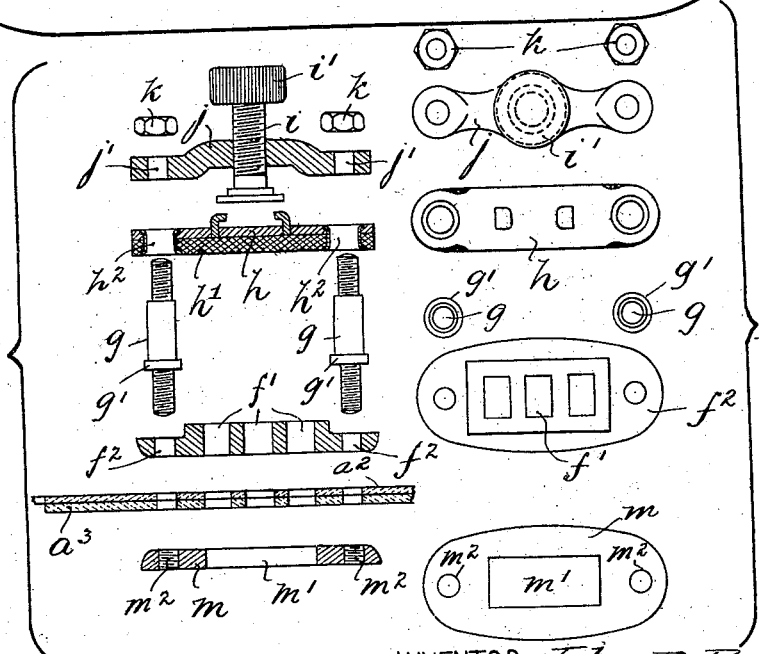
WITNESSES
INVENTOR John B. Brooks
By
James L. Norris
atty No. 852,999. PATENTED MAY 7, 1907.
J. B. BROOKS.
WATER BOTTLE, WATER CUSHION, WATER BED, AND LIKE RECEPTACLE.
APPLICATION FILED NOV. 24, 1906.
3 SHEETS—SHEET 2.
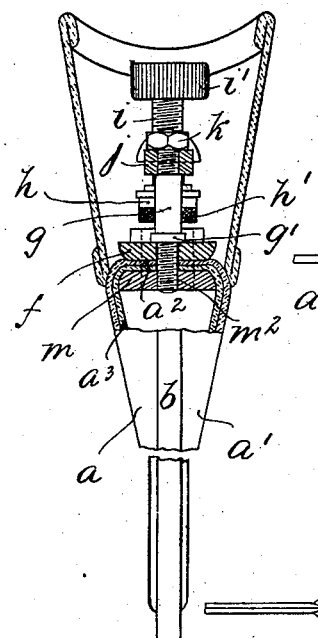
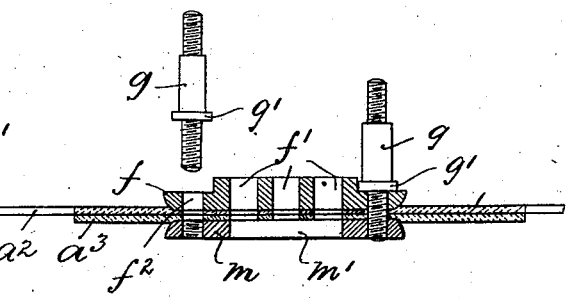
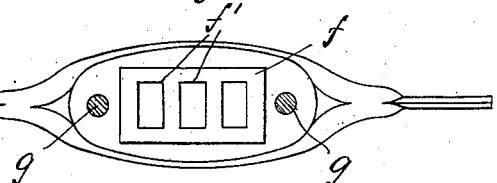
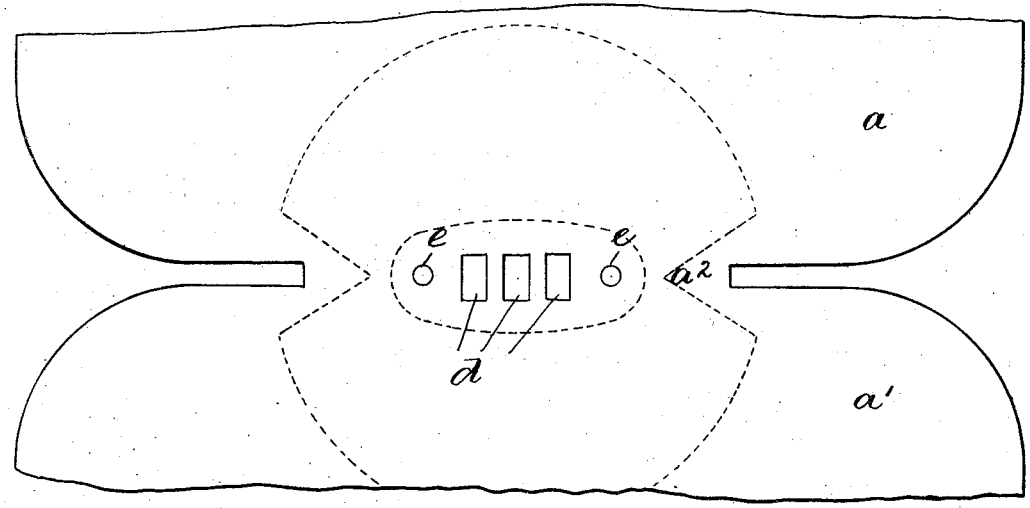
WITNESSES
INVENTOR John B. Brooks
By James L. Norris.
Atty.

No. 852,999. PATENTED MAY 7, 1907.
J. B. BROOKS.
WATER BOTTLE, WATER CUSHION, WATER BED, AND LIKE RECEPTACLE.
APPLICATION FILED NOV. 24, 1906.
3 SHEETS—SHEET 3.
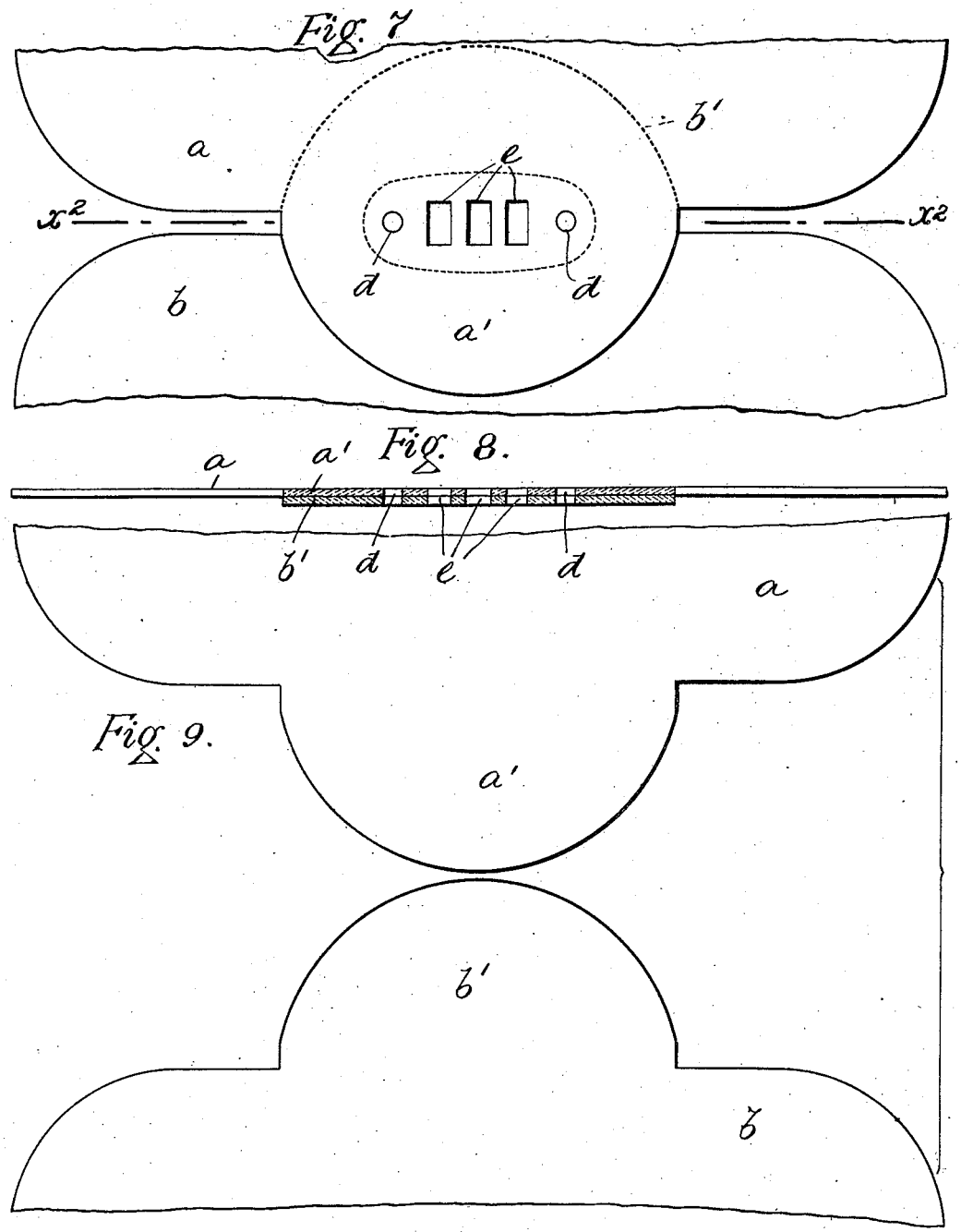
WITNESSES
INVENTOR John B. Brooks
By James L. Norris.

UNITED STATES PATENT OFFICE.

JOHN BOULTBEE BROOKS, OF BIRMINGHAM, ENGLAND.

WATER-BOTTLE, WATER-CUSHION, WATER-BED, AND LIKE RECEPTACLE.

No. 852,999.  Specification of Letters Patent.  Patented May 7, 1907.

Application filed November 24, 1906. Serial No. 344,975.

*To all whom it may concern:*

Be it known that I, JOHN BOULTBEE BROOKS, a subject of the King of Great Britain, residing at Criterion Works, Great Charles street, Birmingham, England, have invented certain new and useful Improvements in Water-Bottles, Water-Cushions, Water-Beds, and Like Receptacles, of which the following is a specification.

This invention has relation to india-rubber and like hot-water bottles, water-beds, water cushions and analogous receptacles for liquids, and also to valve fittings to be used therewith, and has for its object, to provide an improved form or construction of valve and bag whereby the former may be attached to the top portion of the latter by a mechanical connection in such a manner as to obtain a sound and perfectly water-tight joint which will be unaffected by heat and not liable to leak when in use.

Figure 1 of the accompanying drawings represents a part vertical section of a hot water bottle and valve fitting constructed in accordance with this invention. Fig. 2 is a vertical section on dotted line $x$ Fig. 1. Fig. 3 shows partly in section, the mechanical means of securing and clamping the valve fitting to the top of the bottle or bag. Fig. 4 is a horizontal section on dotted line $x^1$ Fig. 1. Fig. 5 represents in vertical section the various component parts of the bag and valve fitting. Fig. $5^a$ is a plan view of the component parts of the valve fitting. Fig. 6 is a plan of a bag blank broken away. Fig. 7 is a modified form of bag blank. Fig. 8 is a section on line $x^2$ Fig. 7, and Fig. 9 is a view of the blank shown in Fig. 8 with the meeting edges separated.

The same letters of reference indicate corresponding parts in each of the above Figs. 1 to 6.

In carrying out our invention as shown in the above figures, we form the hot-water bottle or bag from a single piece of sheet rubber or similar material comprising two halves $a$, $a^1$, each of the same shape and size, united together by a web or solid part $a^2$, as shown in Fig. 5, and adapted to be doubled or folded along this web so that they register or coincide with each other, when the edges of the same are secured together by vulcanizing as at $b$, and reinforced—if desired—by binding or edging strips of rubber or the like which are vulcanized over them. The solid or seamless top which is formed by the web part $a^2$ where the material is folded or doubled upon itself, is pierced with holes $e$ for the passing therethrough of parts of the clamping means of the metallic mouth-piece and valve fitting, and is also provided with openings $d$ through which the liquid passes in the filling and emptying of the bag, while to give body to the clamping and also to strengthen the part clamped, a reinforcing piece $a^3$ is employed, being secured by vulcanizing or the like, to the under side of the part $a^2$. The said fitting consists of a mouth-plate $f$ which comes upon the outside of the bag and is pierced with holes $f^1$ for the passage of water into and out of the bag and which coincide with the openings $d$ in the bag top. At its opposite ends, this pierced plate $f$ supports a pair of vertical pins $g$ which constitute guides for a rising and falling valve plate $h$, whose under side is faced with rubber $h^1$ and whose ends are pierced with holes $h^2$ which take over the said pins $g$ whereby it is prevented from rotating, while its middle part is swivelly connected to the lower end of an operating screw $i$ having a milled head $i^1$ and whose function is to raise or lower the plate so as to uncover or close up and seal the perforated mouth plate $f$. This screw works through a screw-box or wormed hole formed in the center of a yoke bridge or cross-piece $j$ supported by and attached to the guide pins $g$ by shouldering and screwing the upper ends of the latter to take through holes $j^1$ in the ends of the said yoke and providing the same with nuts $k$ which clamp the yoke thereto.

The connection of the above-described fitting to the seamless top $a^2$ of the bag is effected by clamping the material of this top part between the perforated base plate $f$ and a second plate $m$ having a central opening $m^1$ located inside the bag, and for this purpose, the guide pins $g$ are utilized as screw connections which are adapted to draw the two plates together and clamp the interposed material between them. To this end, the lower extremities of the said pins are screwed and correspondingly-wormed holes $m^2$ formed in the inner plate $m$ and plain holes $f^2$ formed in the outer plate $f$, while collars or shoulders $g^1$ are formed on the pins at the junctions of the screw with the plain parts.

In assembling the parts, the two plates $m$ and $f$ are placed respectively on the inside and outside of the top of the bag and the lower ends of the guide pins $g$ are inserted through the holes $f^2$ in the outer plate $f$, and through the corresponding holes $e$ in the interposed material of the bag into the tapped holes $m^2$ in the inner plate $m$. When they are screwed home to such a distance that the collars or shoulders $g^1$ bear against the outer plate $f$ then by continuing the rotation, the two plates are drawn toward one another and the rubber or the like is clamped between them so as to insure a sound water-tight joint being obtained. After these parts of the fitting have been thus attached and adjusted by the guide pins, the valve plate $h$ is passed onto the plain stems of the said pins, followed by the yoke $j$ which carries the swiveling valve-operating screw $i$ and are there secured by screwing the nuts $k$ onto the upper wormed extremities of the said pins. With such an arrangement, should the joint between the valve fitting and the bag become leaky, the defect can be remedied by slackening the nuts $k$ at the upper ends of the guide pins so as to admit of the said pins being rotated for drawing the plates $f$ and $m$ together and exerting an increased clamping effect upon the rubber or material which is included between them.

Fig. 7 shows a modified method of forming the bag in which the two parts or sides of the material are connected together at the mouth or top part by extended and overlapping portions.

Fig. 8 is a section on $x^2$ Fig. 7, while Fig. 9 shows the meeting edges separated, showing more clearly the extended portions, which overlap when placed in position. By this method the bag may be formed from a single piece of material and the two halves or sides $a$ and $b$ formed at the ends with hemispherical projecting tongues $a^1$, $b^1$ adapted to overlap each other as shown in Fig. 7 to form the top of the bag, when they are vulcanized or otherwise secured together. Holes $d$ for the reception of the lower screwed ends of the guide pins and openings $e$ for the filling and emptying of the bag, are then cut out of this top part, and the boundary edges of the parts vulcanized together as in the previous case. The bag may, by this means, be made either in one piece or in two pieces, joined together at both ends.

Having fully described our invention, what we desire to claim and secure by Letters Patent is:—

1. In india-rubber or like hot-water bottles, water-beds, water-cushions and analogous receptacles; the combination with the body of the receptacle, of a valve fitting which is applied to the mouth end of the said receptacle, and a pair of plates, located respectively on the inside and outside of the body of the receptacle, and adapted to be drawn together for clamping the interposed material of the receptacle by a screw action, substantially as herein described.

2. A hot-water bottle or analogous receptacle in which the body of the receptacle is made from a single piece of material doubled or folded upon itself and formed with mouth opening or perforations in the folded part of the material which constitutes a seamless or solid end to the vessel, in combination with a valve-fitting which is applied to the said folded end and mechanically secured within the mouth, substantially as described.

3. A hot-water bottle or receptacle made from a single piece of material, the combination therewith, of a valve fitting provided with a pair of clamping plates arranged so as to come respectively upon the inner and outer sides of the perforated part of the seamless end of the receptacle so that the material adjacent to the said perforations is clamped between the said plates when they are drawn together by a screw, substantially as herein described.

4. In a valve fitting for water bottles and other receptacles; the combination with the body part of the fitting, of a screw-actuated valve-plate, guide pins for said valve-plate adapted to also serve as screws for drawing together the clamping plates and securing the material of the mouth end of the bottle or the like between them, substantially as herein described and set forth.

In testimony whereof I have hereunto set my hand in presence of two subscribing witnesses.

JOHN BOULTBEE BROOKS.

Witnesses:
   Hy. Skerrett,
   Harry Pratt.